Oct. 20, 1931.    R. E. HYDE ET AL    1,828,371
MACHINE FOR CUTTING OFF PIPE, BAR STOCK, AND THE LIKE
Filed Feb. 18, 1928    6 Sheets-Sheet 1

INVENTORS
Ralph E. Hyde and
BY Daniel Schappi
Fay, Oberlin & Fay
ATTORNEYS

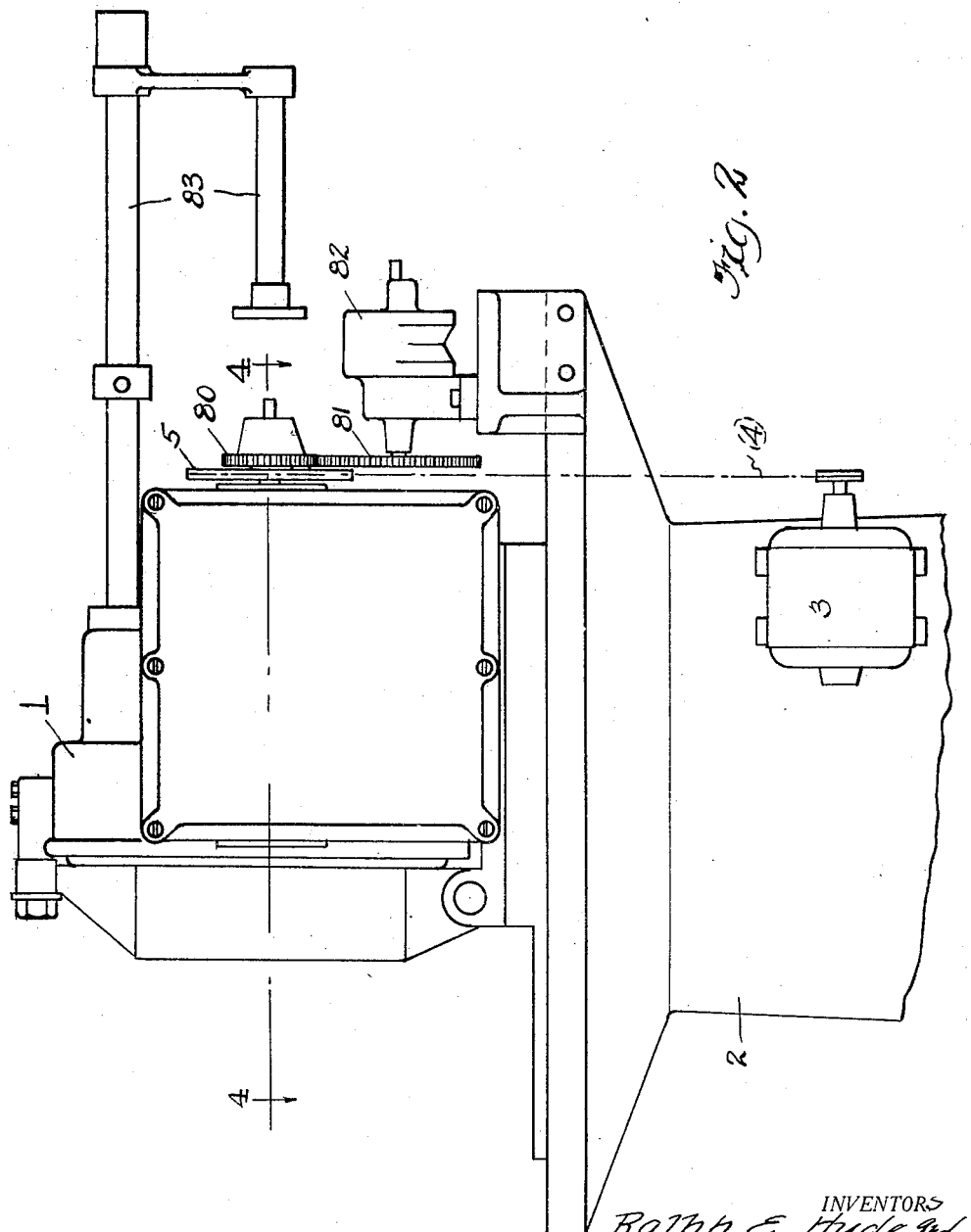

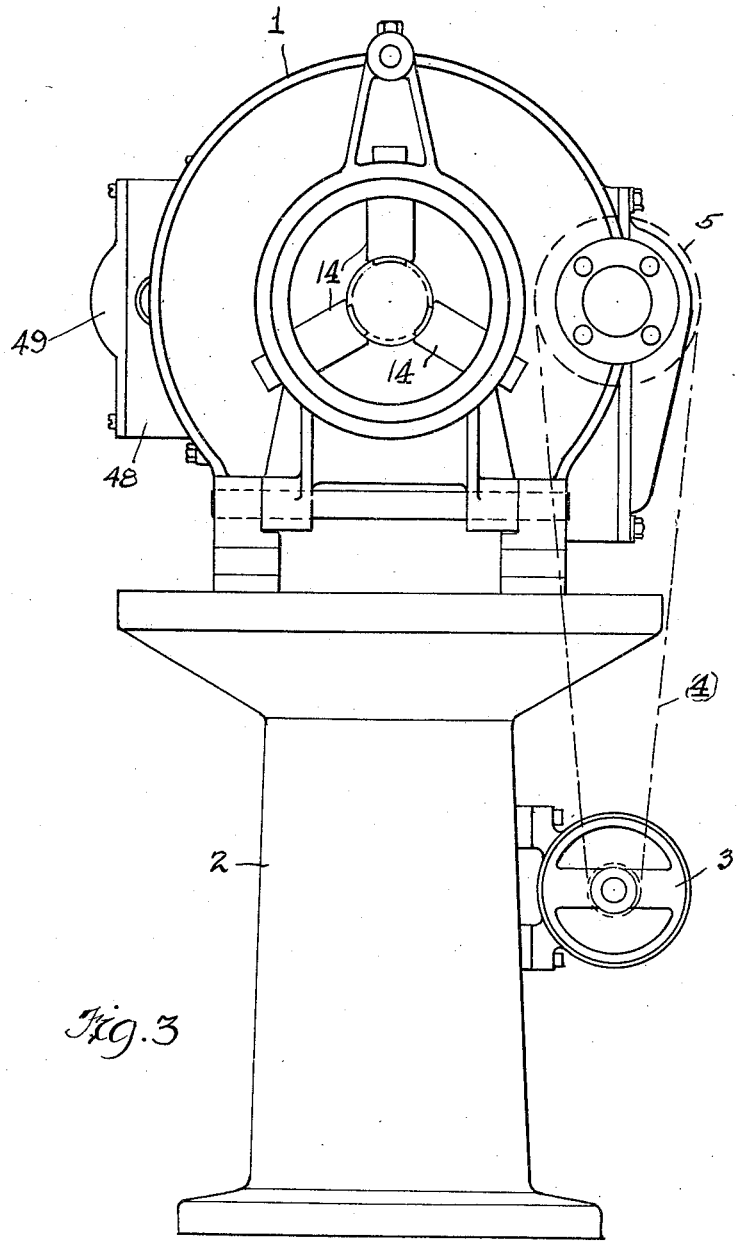

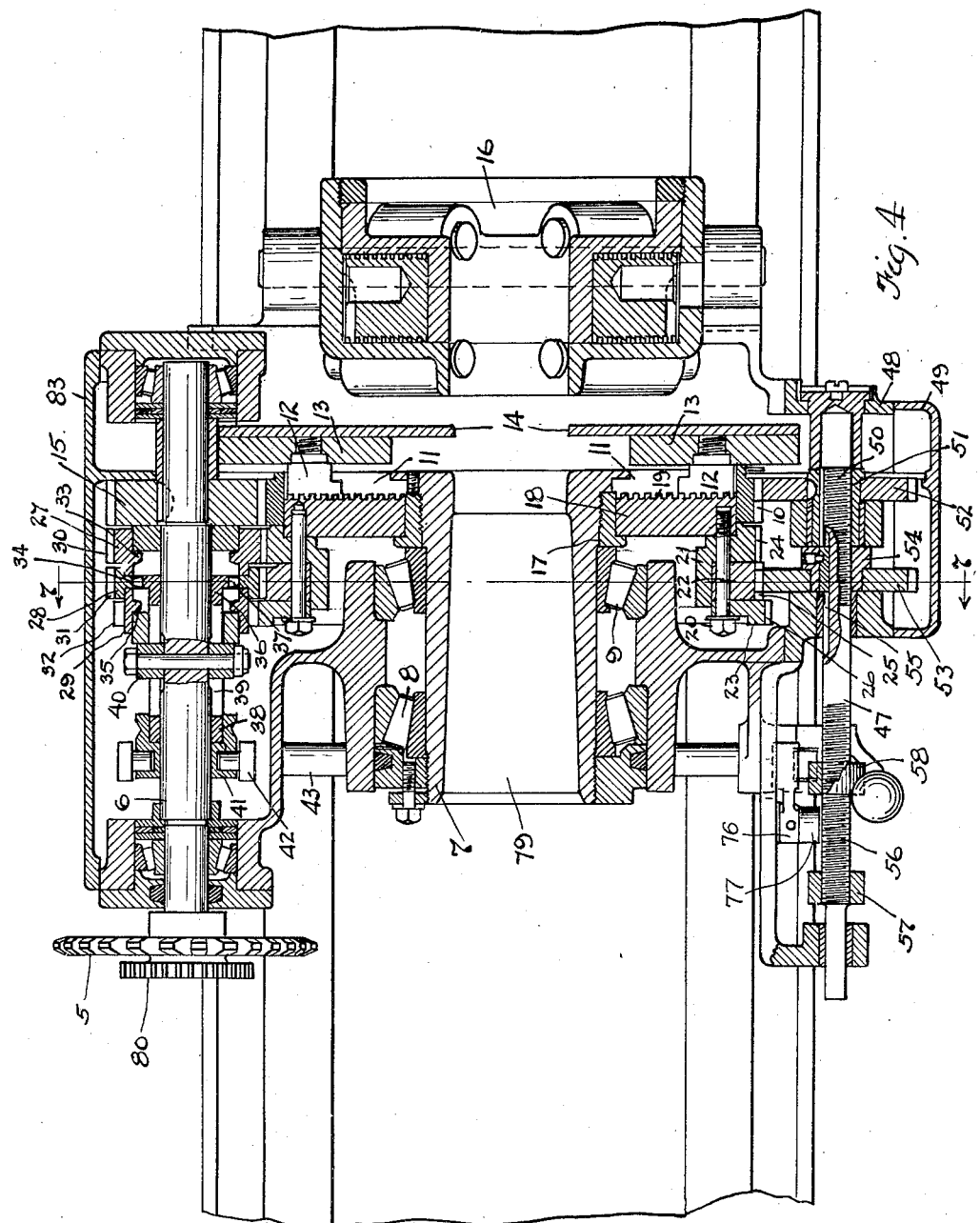

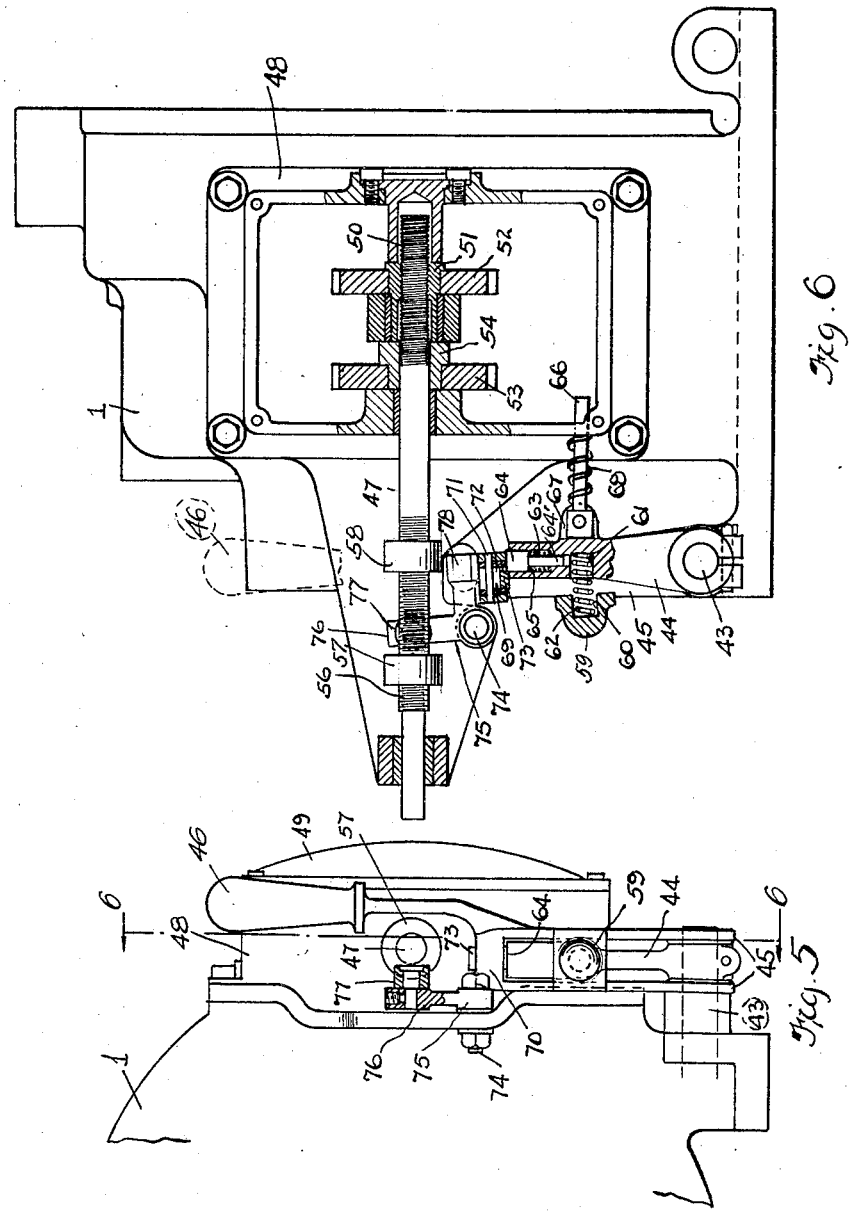

Oct. 20, 1931.  R. E. HYDE ET AL  1,828,371

MACHINE FOR CUTTING OFF PIPE, BAR STOCK, AND THE LIKE

Filed Feb. 18, 1928  6 Sheets-Sheet 6

INVENTORS
Ralph E. Hyde and
BY Daniel Schappi
Fay, Oberlin & Fay
ATTORNEYS

Patented Oct. 20, 1931

1,828,371

UNITED STATES PATENT OFFICE

RALPH E. HYDE, OF CLEVELAND, AND DANIEL SCHAPPI, OF LAKEWOOD, OHIO, ASSIGNORS TO THE OSTER MANUFACTURING COMPANY, OF CLEVELAND, OHIO, A CORPORATION OF OHIO

MACHINE FOR CUTTING OFF PIPE, BAR STOCK, AND THE LIKE

Application filed February 18, 1928. Serial No. 255,363.

The present invention relates, as indicated, to improvements in machines for cutting off pipe, bar stock, and the like, and the primary object thereof is to provide a machine of this type in which, after actuation of a single operating member, the cutters will be automatically advanced to complete the cut and then be automatically returned to a position of rest ready to make a new cut. To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

Figure 1:
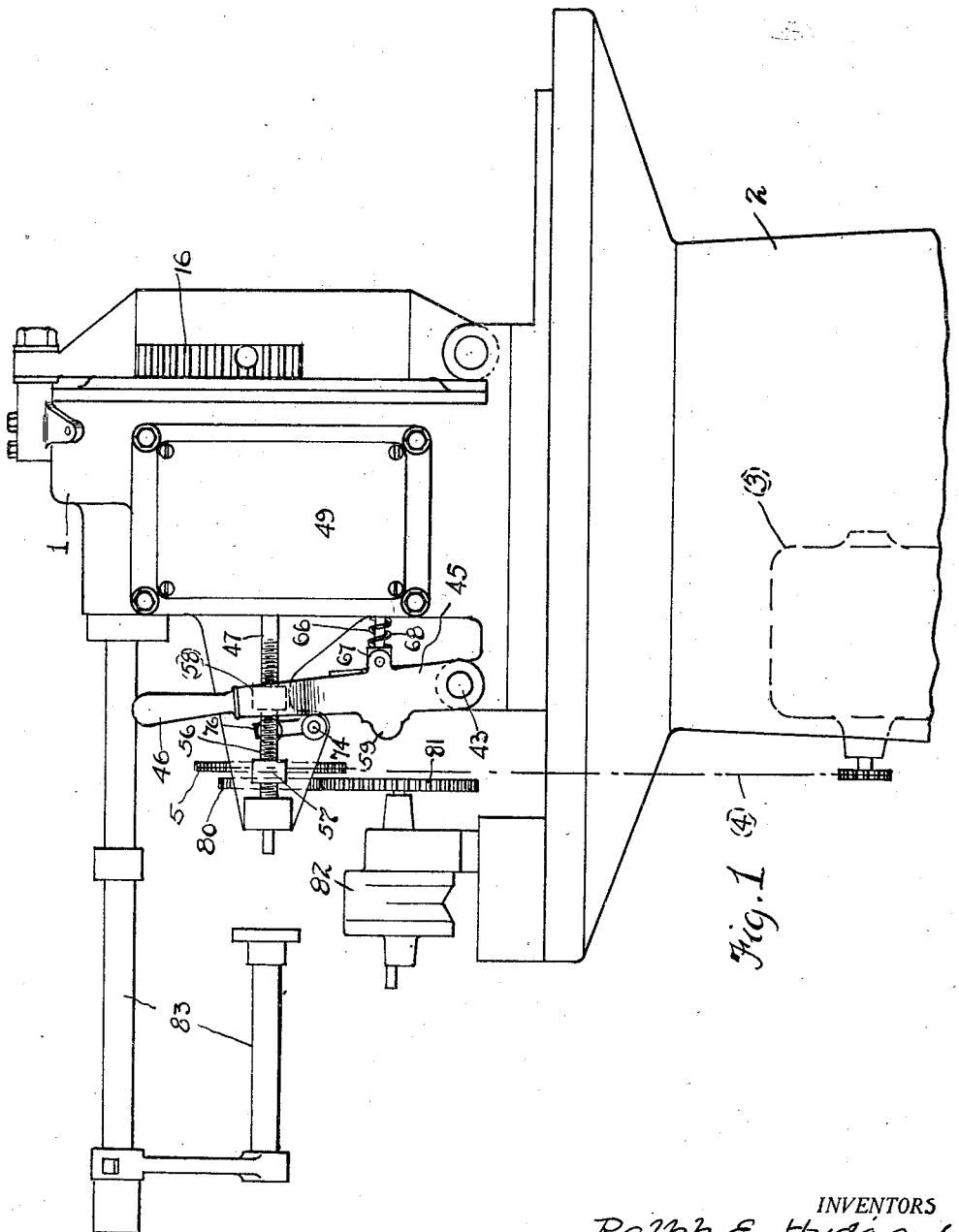
Figure 7:
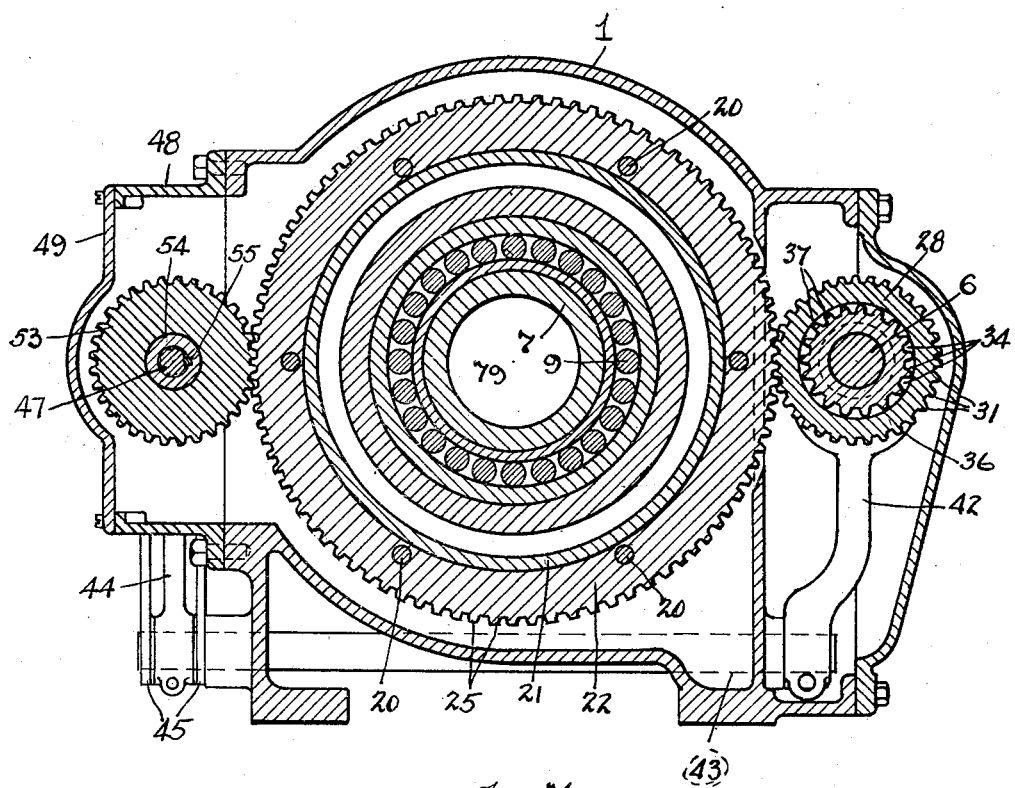
Figure 8:
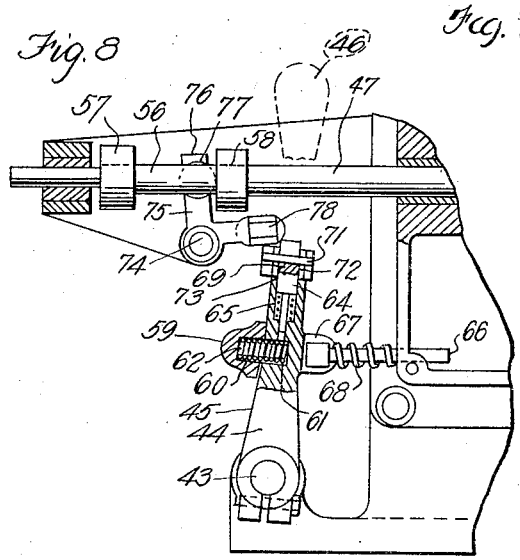
Figure 9:
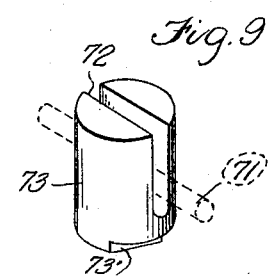

In said annexed drawings:

Fig. 1 is a side elevation of the machine as a whole; Fig. 2 is a similar view from the opposite side of the machine; Fig. 3 is a front elevation of the machine; Fig. 4 is a horizontal sectional view taken substantially on the line 4—4 of Fig. 2; Fig. 5 is a fragmentary elevation of the side of the machine illustrated in Fig. 1 and looking from the rear; Fig. 6 is a side elevation, partly in section taken on the line 6—6, Fig. 5, looking in the direction of the arrows; and Fig. 7 is a transverse sectional view taken substantially on the line 7—7 of Fig. 4; Fig. 8 is a view corresponding to Fig. 6, but showing the parts in another position; and Fig. 9 is a detail of the latch mechanism.

Referring more particularly to the drawings, it will be seen that the machine indicated generally at 1 is of conventional character as regards its general outline, said machine being secured to a base 2 to one side of which is attached a motor 3. Said motor is connected, through a chain 4, or the like, to a sprocket 5 mounted on the drive shaft 6. The machine as a whole is driven by means of said motor 3.

Considering specifically the disclosure of Fig. 4, it will be seen that a tubular spindle 7 is journalled centrally of the machine in roller bearings 8 and 9, and that said spindle 7 carries at its front end a disk, the periphery of which is provided with gear teeth 10. At spaced points, said disk is formed with radially extending slots 11 through which extend threaded lugs 12 secured in slide plates 13 on which are mounted cutters 14. A drive pinion 15 is keyed to the shaft 6 and meshes with said teeth 10. A holding device of any desired character is indicated generally at 16 and is intended to hold the stock in position while the machine is operating.

A bushing 17 is secured to the spindle 7 adjacent the disk thereof, and a scroll plate 18 provided on its front face with a volute thread 19 is rotatably mounted on said bushing 17. Machine screws 20, or the like, secure to the rear face of said scroll plate a plurality of annular gears 21, 22, and 23. The pitch diameter of the teeth 24 of the gear 21 is slightly less than the pitch diameter of the teeth 10, while the pitch diameter of the teeth 25 of the gear 22 is equal thereto and the pitch diameter of the teeth 26 of the gear 23 is materially greater.

Mounted for relative rotation upon a sleeve or collar on the drive shaft 6 is an annular pinion 27. A second annular pinion 28 is mounted for rotation upon a laterally extending flange on the pinion 27, and a similar but opposed laterally extending flange on a third pinion 29, said last-named pinion being rotatably mounted upon a second sleeve or collar on the drive shaft 6. The teeth 30 of the pinion 27 have a pitch diameter slightly greater than the pitch diameter of the pinion 15, and said teeth mesh with the teeth 24 of the gear 21. The teeth 31 of the pinion 28 have a pitch diameter equal to that of the drive pinion 15, and said teeth mesh with the teeth 25 of the gear 22. The pitch diameter of the teeth 32 of the pinion 29 is materially less than the pitch diameter of the drive pinion 15, and said teeth mesh with the teeth 26 of the gear 23. For the sake of convenience, the pinions 27, 28, and 29 will be referred to hereinafter as the feed pinion, the idler pinion, and the return pinion, respectively.

It will be seen that the mounting of the feed, idler, and return pinions is such as to provide an annular space between said pinions and the shaft 6. The feed pinion 27 is provided with internal teeth 33, the idler pinion 28 is provided with internal teeth 34, and the return pinion 29 is formed with internal teeth 35, all of said teeth extending into said annular space and having equal pitch diameters. A control pinion 36 having external teeth 37 adapted for selective meshing with the teeth 33, 34, and 35 is formed with a hub 38, slotted at 39 for the accommodation of a key 40, and is slidably mounted upon said shaft 6. The end of the hub 38 rotatably receives a collar 41 sleeved on said shaft 6, and a yoke 42 is secured to said collar. The yoke 42 is attached at its opposite end to a rock shaft 43 which extends across the machine and has secured thereto at its opposite end an operating arm 44. The bifurcated lower ends 45 of a handle 46 straddle said operating arm 44 and are journalled on the rock shaft 43 (see Fig. 5). The structural details of the arm 44 and handle 46, and their operation, will be described hereinafter.

On the side of the machine opposite from the drive shaft 6 there is journalled a control shaft 47, one end of said shaft extending into an extension casing 48 closed by a cover member 49. Said shaft 47 is screw-threaded at the end enclosed in said casing 48 as indicated at 50, and at said threaded end cooperates with internal threads formed on a sleeve 51 journalled within said casing 48 for rotation, but held against reciprocation. The pinion 52 is keyed to the sleeve 51 and meshes with the teeth 10 of the spindle disk. A second pinion 53 is keyed to said shaft 47 through the medium of the collar 54, said collar carrying a key slidable in a slot 55 formed in said shaft 47, and said pinion 53 meshes with the teeth 25 of the gear 22. Since the pitch diameters of the teeth 10 and 25 are equal and the pitch diameters of the pinions 52 and 53 are equal, it will be seen that any differential between the speeds of the spindle 7 and the scroll plate 18 will be transmitted to the sleeve 51 and the shaft 47, whereby the shaft 47, through the action of the threads 50 and the internal threads on the sleeve 51, will be reciprocated. Said shaft 47 is further threaded as at 56 adjacent its opposite end, and internally threaded stop collars 57 and 58 are adjustably mounted on said threaded portion 56.

A connecting member 59 extends between and is fastened rigidly to the arms 45 of the handle 46 intermediate the ends thereof, and said connecting member is formed with a recess 60 adapted to register with an opposed recess 61 formed in one side of the operating arm 44. A compression spring 62 has its opposite ends received in said recesses 60 and 61. The upper or free end of said operating arm 44 is provided with a vertical recess 63 receiving a latch button 64 which is urged outwardly by a compression spring 65 housed within said recess 63, the latter being guided by a stem 64'. A rod 66 is pivotally connected to an ear 67 formed on the side of said operating arm 44 opposite the side in which the recess 61 is formed, and a compression spring 68 is sleeved upon said rod, bearing at one end against the casing 48 and at its opposite end against the ear 67. An aperture 69 is formed in the base 70 of the yoke portion of the handle 46 in such a position as to register, at times, with the open end of the recess 63 in the operating arm 44. Said aperture is traversed by a pin 71 extending through a slot 72 in a plug 73 loosely mounted in said aperture 69, and said pin 71 limits the reciprocating motion of said plug 73, as will be clearly seen in Figs. 6 and 8. As best shown in Fig. 9, the lower edge of the plug 73 is slightly notched on one side, as at 73', to engage the latch button 64 when in certain positions. Mounted to swing upon a pivot 74 is a bell crank lever 75, one arm 76 of which carries a roller 77 in the path of the stops 57 and 58, and the other arm of which carries a weight 78, which, in the position of Fig. 6, rests upon the upper edge of the plug 73.

Adjacent the sprocket 5 on the drive shaft 6 there is carried a pinion 80 in the mesh with a gear 81 carried on the spindle of a pump 82, said pump providing for forced lubrication of the machine. A means for gauging the length of pieces to be cut off of stock is indicated generally at 83.

The operation of the machine will now be described. A piece of material to be cut off is inserted through the vise 16 and the bore 79 of the spindle 7. At this time the parts of the machine are substantially in the positions illustrated in the various figures. The motor 3 is now energized, and the drive pinion 15 rotates the spindle 7 while the clutch pinion 36 rotates the scroll plate through the idler pinion 28 and the gear 22. Since the pitch diameters of the idler pinion 28 and the drive pinion 15 are equal, and the pitch diameters of the teeth 10 and of the teeth 25 are equal, the spindle and the scroll plate will be rotated at equal speeds and the cutters 14 will be neither advanced nor retracted, and the control shaft 47 will not be reciprocated. To start the cut, the operator throws the handle 46 to the right from the position of Fig. 6. The notch 73' in the edge of the plug 73 engages the projecting end of the latch button 64 as shown in Fig. 6 and moves the operating arm 44 to the right toward the position of Fig. 8. This movement rocks the rock shaft 43 in a clockwise direction and moves the teeth 37 of the clutch pinion 36 into mesh with the internal teeth 33 of the feed pinion 27. As the operator moves the handle 46 toward the right from the position of Fig. 6 into that of Fig. 8, the spring 68 is compressed and finally the upper end of the plug 73 is carried out from under the weight 78 on the bell crank lever 75. During this motion the increasing resistance of spring 68 causes the shallow notch 73' to override the edge of the button 64, bringing 64 into registry with the aperture 69. Thus when the top of the plug 73 is free of the weight 78, the plug 64, urged up by its spring 63, forces the plug 73 up, allowing the button 64 to enter the aperture 69, thus locking the arm 44 with the lever 45—46. The pin 71 limits the upward travel of the plug. The movement into the position of Fig. 8 has compressed the spring 62, and this spring would force the arms 45 leftward away from the arm 44 were it not for the locking effect of the members 64 and 69. The upward movement of the plug 73 also raises the top of the plug to engage the front edge of the weight 78, so that the weight and its carrying arm act as a latch to maintain the arms 45, (to which the arm 44 is now locked) in the position of Fig. 8 with the springs 68 and 62 compressed.

The teeth 37 of the pinion 36 being in engagement with the teeth 33 of the feed pinion 27, it will be seen that the scroll plate is being driven through the teeth 30 of said feed pinion 27 and their engagement with the teeth 24 of the gear 21. It will be remembered that the pitch diameter of the feed pinion 27 is slightly greater than that of the drive pinion 15, while the pitch diameter of the teeth 24 is slightly less than that of the teeth 10. Consequently it will be seen that the scroll plate 18 will be rotated slightly faster than is the spindle 7, and this differential will cause the lugs 12 to follow the thread 19 to advance the cutters 14 toward the center of the machine. This differential likewise will cause the shaft 47 to rotate slightly faster than the sleeve 51, thus moving the control shaft toward the left as viewed in Fig. 4. If the stop 58 is properly set, its movement toward the left will swing the bell crank lever 75 in a counter-clockwise direction to lift the weight 78 out of engagement with the extending end of the plug 73 at exactly the moment when the cut has been completed. Since the engagement between said weight 78 and the plug 73 is released, the spring 68 will force the handle 46 and the operating arm 44 toward the left as viewed in Fig. 6, thus rotating the rock shaft 43 in a counter-clockwise direction to move the pinion 36 into such a position that the teeth 37 thereof will mesh with the internal teeth 35 of the return pinion 29. The handle is thus brought into such a position that the weight 78 of the lever 75 overlies the extending end of the plug 73.

In this position of the parts, the scroll plate is being driven through the engagement of the teeth 32 of the return pinion with the teeth 26 of the gear 23. It will be readily understood that, since the pitch diameter of the teeth 32 is materially less than the pitch diameter of the pinion 15 while the pitch diameter of the teeth 26 is materially greater than the pitch diameter of the teeth 10, the scroll plate will be rotated at a speed considerably less than that at which the spindle is rotated. This differential causes the cutters to be quickly retracted, and causes the control shaft 47 to be moved quickly toward the right, thus bringing the stop collar 57 into engagement with the roller 77 to swing the bell crank lever 75 in a clockwise direction to depress the plug 73. Depression of said plug forces the latch button 64 out of the aperture 69 and permits the spring 62 to rotate the operating arm 44 in a clockwise direction without any corresponding movement of the handle 46. The relative strengths of the springs 62 and 68 are such that when the handle 46 and the operating arm 44 are in the relative positions indicated in Fig. 6, said strengths are balanced. Thus it will be seen that the springs 62 and 68 will come to a condition of equilibrium when the handle 46 and operating arm 44 are in the positions indicated in Fig. 6 and the pinion 36 is in mesh with the internal teeth 34 of the idler pinion 28 as shown in Fig. 4. The cycle of the mesh has now been completed, and it is necessary for the operator to loosen the mechanism 16 and move the stock forward into position for a new cut after which he may again swing the handle 46 to the right to start a new cycle.

It will be seen that the present machine is capable of advancing the cutters to complete a cut, and of then automatically reversing the reciprocating movement of the cutters and retracting them to a ready position and bringing them to a condition of rest, all without any such shock as usually accompanies the sudden reversing of a reciprocating motion.

Other modes of applying the principle of our invention may be employed instead of the one explained, change being made as regards the mechanism herein disclosed, provided the means stated by any of the following claims or the equivalent of such stated means be employed.

We therefore particularly point out and distinctly claim as our invention:

1. In a cut-off machine, a spindle and a scroll plate, means including a gear for rotating said spindle at a given speed, means for selectively rotating said scroll plate at speeds greater, less, and equal to the speed of said spindle, said selective means including a slidable clutch pinion selectively engageable with differentially sized gears connected to said scroll plate, and automatic means for actuating said selective means.

2. In a cut-off machine, a spindle and a scroll plate and means to drive said spindle and scroll plate comprising a drive shaft, a drive pinion keyed to said shaft and engaging a gear on said spindle, a feed pinion loosely mounted on said shaft and meshing with a gear on said scroll plate, and having also internal teeth, a sliding pinion on said shaft, and means for moving said sliding pinion into and out of engagement with said internal teeth.

3. In a cut-off machine, a spindle and a scroll plate, gears carried by said spindle and scroll plate, a drive shaft mounted adjacent said spindle and scroll plate, a drive pinion keyed to said shaft and meshing with said spindle gear, a sleeve mounted on said shaft, a feed pinion journalled on said sleeve and having a pitch diameter greater than the pitch diameter of said drive pinion, a collar spaced from said sleeve on said drive shaft and providing an annular space between itself and said shaft, a return pinion journalled on said collar and having a pitch diameter substantially less than that of said drive pinion, an idler pinion mounted between said feed pinion and said return pinion and journalled on flanges on said return pinion and on said feed pinion and having a pitch diameter equal to that of said drive pinion, the external teeth of said feed pinion, idler pinion, and return pinion meshing with said scroll plate gears, internal teeth on said feed pinion, said idler pinion, and said return pinion, and a gear slidably keyed to said shaft and received in said annular space and adapted to be engaged selectively with the internal teeth of any one of said pinions.

4. In a cut-off machine, a spindle and a scroll plate, means including a gear for rotating said spindle at a given speed, means for selectively rotating said scroll plate at speeds greater, less, and equal to the speed of said spindle, said selective means comprising a pinion slidable on a drive shaft and adapted to be engaged selectively with any one of a plurality of pinions meshing with gears on said scroll plate.

5. In a cut-off machine, a spindle and a scroll plate, means for rotating said spindle at a given speed, means for selectively rotating said scroll plate at speeds greater, less, and equal to the speed of said spindle, said selective means including a slidable clutch pinion selectively engageable with differentially sized gears connected to said scroll plate, and means dependent upon the differential of the speeds of said spindle, and scroll plate for actuating said selective means.

6. The combination with a cut-off machine comprising a spindle and a scroll plate, means including a gear for rotating said spindle at a given speed, means for selectively rotating said scroll plate at speeds greater, less, and equal to the speed of said spindle, said selective means comprising a pinion slidable on a drive shaft and adapted to be engaged selectively with any one of a plurality of pinions meshing with gears on said scroll plate, of automatic means for actuating said slidable pinion comprising a yoke engaging the same and mounted on a rock shaft, an operating arm mounted on said rock shaft, and means including said spindle gear and said scroll plate gear for shifting said handle.

Signed by us this 26 day of January, 1928.

RALPH E. HYDE.
DANIEL SCHAPPI.